(12) United States Patent
Biller et al.

(10) Patent No.: US 6,932,324 B2
(45) Date of Patent: Aug. 23, 2005

(54) BUCKLE TENSIONER

(75) Inventors: Joachim Biller, Lorch (DE); Alexander Heilig, Wissgoldingen (DE)

(73) Assignee: TRW Occupant Restraint Systems GmbH & Co. KG, Alfdorf (DE)

(*) Notice: Subject to any disclaimer, the term of this patent is extended or adjusted under 35 U.S.C. 154(b) by 0 days.

(21) Appl. No.: 10/457,305

(22) Filed: Jun. 9, 2003

(65) Prior Publication Data

US 2004/0000783 A1 Jan. 1, 2004

(30) Foreign Application Priority Data

Jun. 27, 2002 (DE) ..................... 202 09 965 U

(51) Int. Cl.[7] ................................................ B21F 9/00
(52) U.S. Cl. .................. 254/230; 280/806; 297/480
(58) Field of Search ................................ 254/199, 230, 254/241; 280/806; 474/110, 115; 297/480, 471, 474

(56) References Cited

U.S. PATENT DOCUMENTS

| 1,260,716 | A | * | 3/1918 | Sayre ........................ 254/230 |
|---|---|---|---|---|
| 4,702,117 | A | * | 10/1987 | Tsutsumi et al. .......... 74/89.17 |
| 5,374,110 | A | * | 12/1994 | Hiramatsu .................. 297/480 |
| 5,553,890 | A | * | 9/1996 | Buhr et al. ................ 280/806 |
| 5,762,372 | A | * | 6/1998 | Koujiya et al. ............ 280/806 |
| 6,039,353 | A | * | 3/2000 | Bauer et al. ............... 280/806 |
| 6,076,856 | A | * | 6/2000 | Wang et al. ............... 280/806 |
| 6,237,958 | B1 | * | 5/2001 | Patrickson ................ 280/806 |
| 6,264,281 | B1 | * | 7/2001 | Dukatz et al. ............ 297/480 |
| 6,454,306 | B1 | * | 9/2002 | Cunningham et al. .... 280/806 |
| 6,460,935 | B1 | * | 10/2002 | Rees et al. ................ 297/478 |
| 2002/0005640 | A1 | * | 1/2002 | Nagata et al. ............ 280/806 |
| 2003/0030264 | A1 | * | 2/2003 | Motozawa ................ 280/806 |
| 2003/0090101 | A1 | * | 5/2003 | Ennerdal .................. 280/806 |
| 2003/0122362 | A1 | * | 7/2003 | Ukita et al. ............... 280/806 |

FOREIGN PATENT DOCUMENTS

| DE | 19629263 | 2/1997 |
|---|---|---|
| DE | 19941435 | 4/2001 |
| DE | 19961799 | 7/2001 |
| DE | 10027599 | 10/2001 |
| EP | 0655371 | 5/1995 |
| EP | 0672564 | 9/1995 |

* cited by examiner

Primary Examiner—Emmanuel Marcelo
(74) Attorney, Agent, or Firm—Tarolli, Sundheim, Covell & Tummino L.L.P.

(57) ABSTRACT

A buckle tensioner for pre-tensioning a safety belt band comprises a traction transmission device engaging on a belt buckle, a motor and a pressure storing device which is able to be compressed by means of the motor. The traction transmission device is coupled in a force-fitting manner to the pressure storing device and the pressure storing device is arranged such that an expansion of the pressure storing device brings about a pulling away of the belt buckle for tensioning the safety belt band.

11 Claims, 3 Drawing Sheets

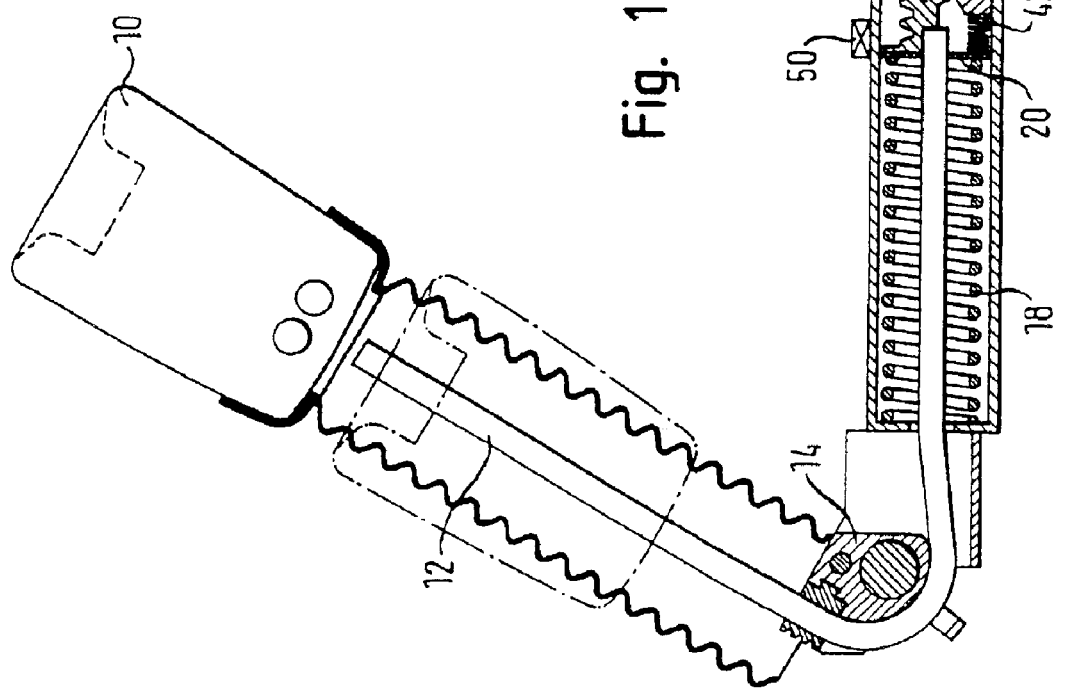

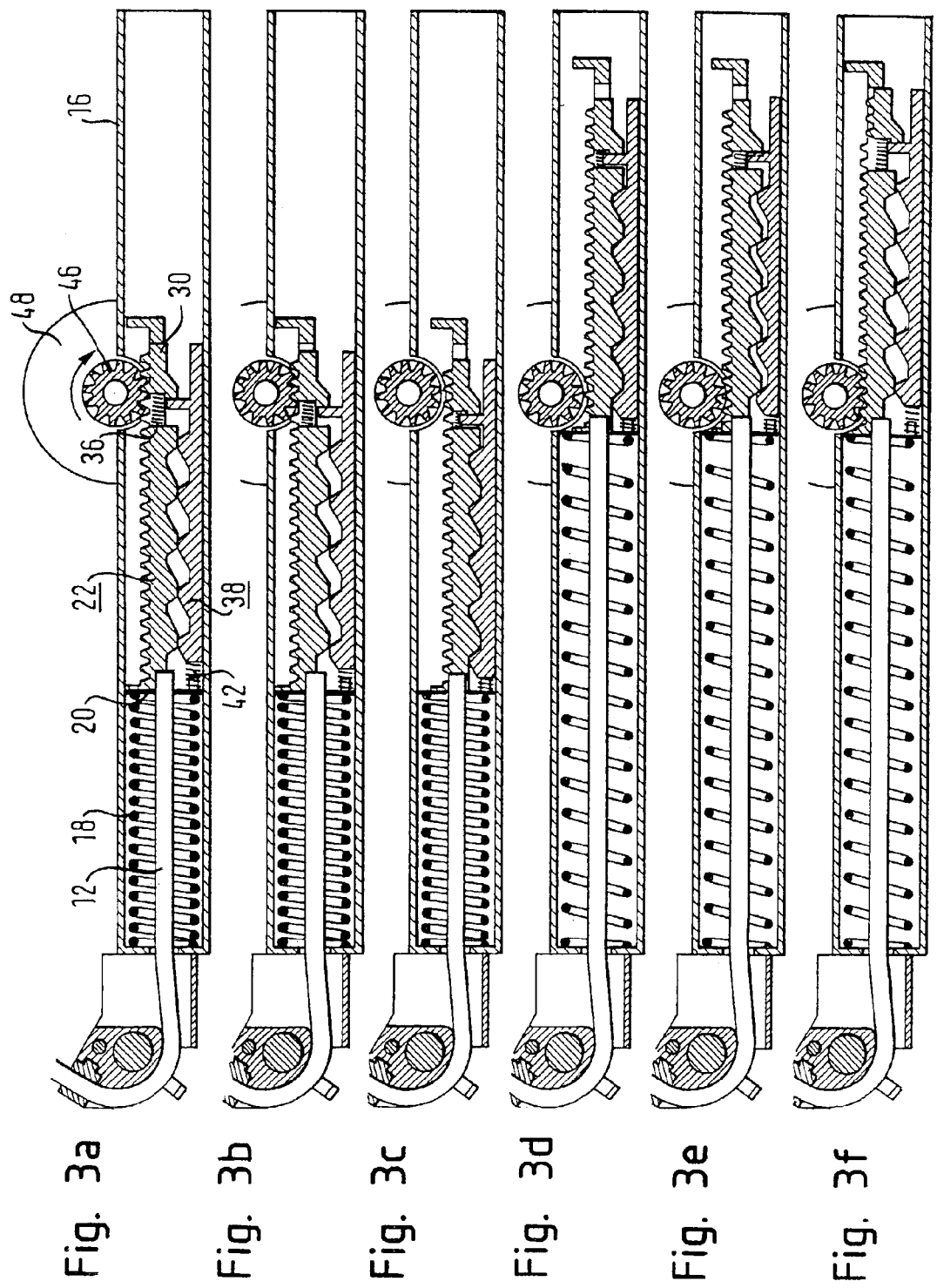

BUCKLE TENSIONER

TECHNICAL FIELD

The invention relates to a buckle tensioner for pre-tensioning a safety belt band.

BACKGROUND OF THE INVENTION

Conventional buckle tensioners have a traction transmission device engaging on a belt buckle, a motor and a pressure storing device which is able to be compressed by means of the motor.

Such a buckle tensioner is known from the DE 199 61 799. In this reversible buckle tensioner, an electromotive drive provides for a pre-tensioning of the safety belt band in the case of an imminent accident, by a piston of the tensioner drive, coupled to a belt buckle, being brought into an intermediate position. If a collision does not take place, the piston is returned into its initial position by a compression spring, so that the belt buckle is situated in its normal position again.

The invention provides a buckle tensioner which makes possible a reliable, reversible pre-tensioning with favorably priced components.

BACKGROUND OF THE INVENTION

According to the invention, a buckle tensioner for pre-tensioning a safety belt band comprises a traction transmission device engaging on a belt buckle, a motor and a pressure storing device which is able to be compressed by means of the motor. The traction transmission device is coupled in a force-fitting manner to the pressure storing device and the pressure storing device is arranged such that an expansion of the pressure storing device brings about a pulling away of the belt buckle for tensioning the safety belt band. In contrast to the known buckle tensioner, the motor is not used for the actual pre-tensioning process, but rather serves for the previous compression of the pressure storing device. The expansion of the pressure storing device is used for the pre-tensioning process. As the compression of the pressure storing device is non-critical with respect to time and only has to be repeated possibly after an actual pre-tensioning process, a simple motor can be used for this. The only prerequisite is that the motor provides the torque necessary for compressing the pressure storing device. The pressure storing device preferably comprises a helical spring, but a pressure storing device which works with a compressible fluid (pneumatic or hydraulic pressure reservoir) can also be used.

The motor is preferably constructed so as to be self-locking, so that after the compression of the pressure storing device by the motor, no further steps are necessary in order to keep the pressure storing device in its compressed state. Alternatively, however, the pressure storing device can also be kept in a compressed state by a locking device.

In the preferred embodiment of the invention, the expansion of the pressure storing device is brought about by a trigger device which is able to be activated by the motor. Therefore, the motor has a dual function: Firstly, it is used for compressing the pressure storing device, to set the buckle tensioner into the state ready for operation; secondly, if required in a precrash situation, it activates the trigger device. This saves additional components which would otherwise be necessary for triggering the pre-tensioning process.

Preferably the pressure storing device is compressed by means of a longitudinally displaceable first rack, driven by the motor. According to the preferred embodiment of the invention, the motor is coupled to a pinion which engages into first teeth of the first rack, the latter being brought out of engagement with the pinion by activation of the trigger device. Thus, the compressed pressure storing device can be released in a simple manner to carry out the pre-tensioning process.

A particular advantage is produced in that the trigger device comprises a trigger piece movably supported on the first rack and coupled to a second rack having teeth which are constructed so as to be complementary to second teeth of the first rack, the second teeth of the first rack being brought into engagement with the teeth of the second rack on activation of the trigger device, and the racks being arranged such and the profiles of the teeth of the racks being constructed such that a relative displacement of the second rack with respect to the first rack brings the first teeth of the first rack into engagement with the pinion again. Such a construction makes it possible after a pre-tensioning process to return the tensioner mechanism in a simple manner into a state in which the pressure storing device can be compressed again, so that the buckle tensioner is available for a further pre-tensioning process.

For the emergency tensioning, following the pre-tensioning in an actual accident, according to a further development of the invention a pyrotechnic device is provided, which is coupled to the buckle tensioner such that through the pyrotechnic device a further tensioning is achieved which goes beyond that obtained through the expansion of the pressure storing device.

BRIEF DESCRIPTION OF THE DRAWINGS

FIG. 1 shows a lateral sectional view of a buckle tensioner according to the invention;

FIG. 2 shows an enlarged sectional view of the tensioner of FIG. 1 along the line A—A;

FIGS. 3a–3f show partial views in section of the buckle tensioner of FIG. 1 in various phases of the buckle tensioning.

DETAILED DESCRIPTION OF THE PREFERRED EMBODIMENTS

Figure 4:
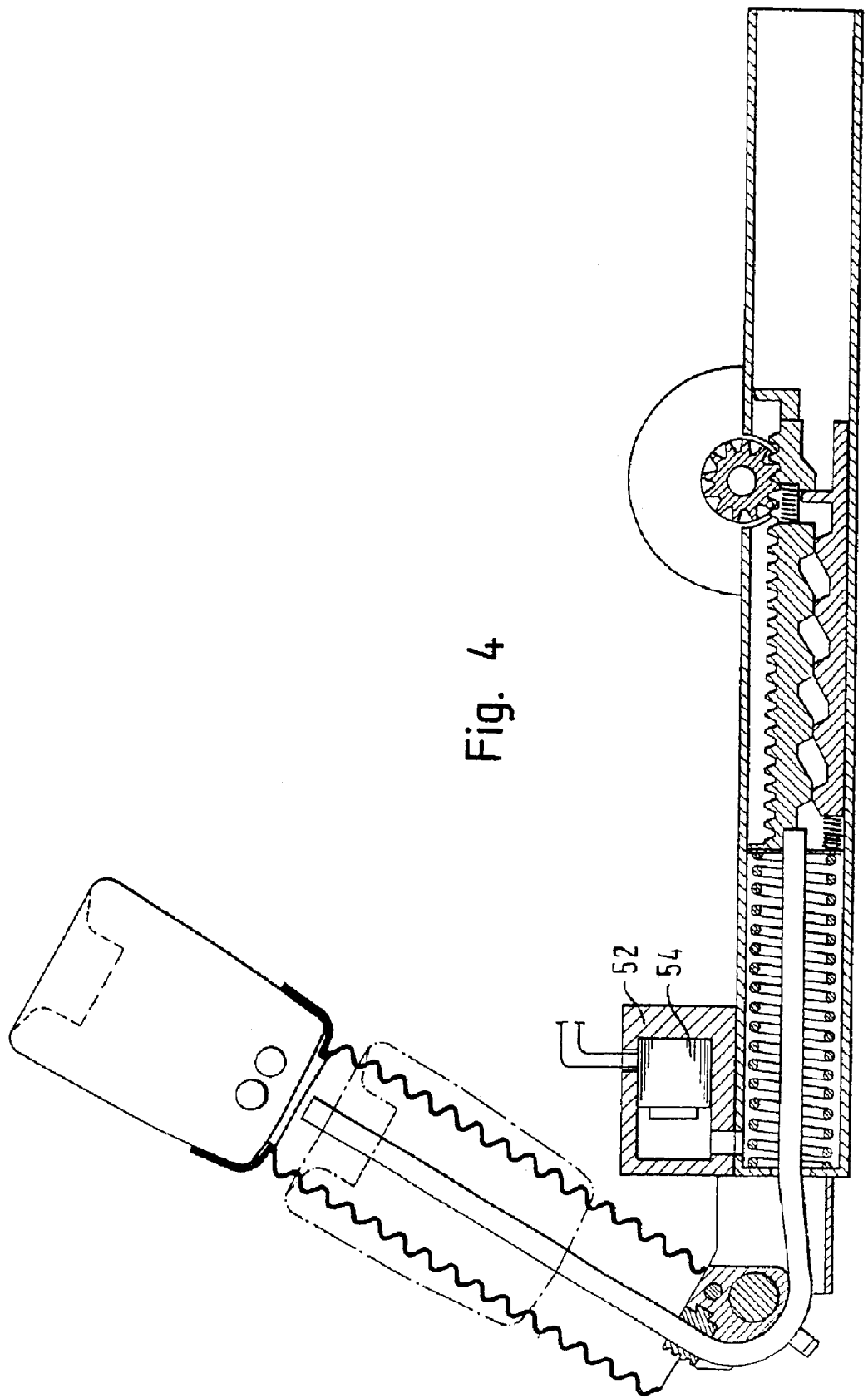
FIG. 4 shows a lateral sectional view of a further development of the buckle tensioner according to the invention.

The buckle tensioner illustrated in FIG. 1 comprises a belt buckle 10, to the lower end of which a first end of a rigid traction cable 12 is coupled. The traction cable 12, running obliquely downwards, is guided over a deflection device 14 in a horizontal direction parallel to the vehicle floor. In this horizontal direction, adjoining the deflection device 14 is an elongated, cylindrical tube 16 into which the traction cable 12 is introduced. At the front end of the tube 16, facing the deflection device 14, the front end of a helical spring 18 rests, which is coupled to the traction cable 12 in a force-fitting manner. The rear end of the helical spring 18 rests against a support ring 20, which is firmly connected with a first rack 22 arranged in the tube 16. In an alternative embodiment, the support ring 20 is constructed in one piece with the rack 22.

The first rack 22 is held in the tube so as to be both longitudinally displaceable and also vertically movable. A central part 24 of the first rack 22 (see FIG. 2) has upper and lower teeth, the upper teeth 26 being closely spaced and having a symmetrical profile, whereas the lower teeth 28 are spaced further apart and have an asymmetrical profile with a steeply rising flank on one side and a slightly falling flank on the other side. A rear section of the toothed central part 24 (designated below as trigger piece 30) is held so as to be longitudinally displaceable between an end piece 32 of the first rack 22 and the front section 34 of the central piece 24, and is prestressed by a first spiral spring 36 towards the end piece 32. Underneath the first rack 22, a second rack 38 is arranged with an upwardly pointing toothing, the teeth 40 of which are constructed so as to be complementary to the lower teeth 28 of the first rack 22. The front end of the second rack 38, facing the support ring 20, lies against a second spiral spring 42 which rests on the side of the support ring 20 facing away from the helical spring 18. An upwardly extending extension 44 in the rear region of the second rack 38 projects between the front section 34 of the central piece 24 and the trigger piece 30 of the first rack 22. The trigger piece 30 with the first spiral spring 36 and the second rack 38 together form a trigger device, the function of which is explained further below with the aid of FIGS. 3a–3f.

A pinion 46, which is driven by a direct-current motor and is non-rotatably coupled to the motor shaft thereof, engages into the upper teeth 26 of the first rack 22. Therefore, the first rack 22 can be displaced in longitudinal direction. At a predetermined location on the tube 16 a sensor 50 is arranged, which detects a passing of the support ring 20.

The mode of operation of the buckle tensioner is described below with the aid of FIGS. 3a–3f. In order to reach the normal state of the buckle tensioner with the helical spring 18 being in the pre-stressed state (shown in FIG. 3a), the first rack 22 is pushed to the left against the force of the helical spring 18 by a clockwise rotation of the pinion 46 until the sensor 50 registers the passing of the support ring 20 and the motor 48 is then switched off. During the pre-stressing, the two racks 22, 38 do not mesh with each other, but rather the lower teeth 28 of the first rack 22 lie on the teeth 40 of the second rack 38. Due to the extension 44 lying against the trigger piece 30, however, the second rack 38 is also displaced with the first rack 22. On completion of the motor movement, the pinion 46 is only in engagement with the teeth 26 of the trigger piece 30. The racks 22, 38 remain in the position shown in FIG. 3a, because the motor 48 locks and hence the immovable pinion 46 prevents a pushing back of the first rack 22. Alternatively, a locking of the support ring 20 can also be provided, for example by means of a catch engaging into a recess of the tube 16.

FIGS. 3b and 3c show the unlocking phase of the tensioner mechanism before an imminent accident. The motor 48 turns the pinion 46 clockwise, until the trigger piece 30 has displaced the second rack 38 to the left against the force of the two spiral springs 36, 42 approximately by half the width of a tooth 28 or 40. From the forces transferred by the pinion 46 and the helical spring 18 to the first rack 22, a downwardly directed force component is also produced. Therefore, owing to the relative position of the teeth 28 and 40 with respect to each other, the first rack 22 can move downwards until the teeth 28, 40 engage fully into each other and the first rack 22 is out of engagement with the pinion 46.

Through the release of the first rack 22 the helical spring 18, which is coupled to the traction cable 12, will expand abruptly, so that the belt buckle 10 is pulled away obliquely downwards. When, after the pre-tensioning is completed, the two racks 22, 38 displaced towards the right have reached the end position shown in FIG. 3d, the second spiral spring 42 forces the second rack 38 further towards the right. Owing to the special profile of the teeth 28 and 40 and of the special mechanism including the movably supported trigger piece 30 and the first spiral spring 36, which counteracts a displacement of the first rack 22 towards the right, an upwardly directed force onto the first rack 22 is produced. The first rack 22 is thereby forced upwards, until it is in engagement with the pinion 46 again and the lower teeth 28 lie opposite the teeth 40 of the second rack 38 (see FIGS. 3e and 3f). By further rotation of the pinion 46 in a clockwise direction, the helical spring 18 can be compressed again and the buckle tensioner mechanism can be brought again into the initial position shown in FIG. 3a.

In FIG. 4, a further development of the buckle tensioner according to the invention is shown, in which in addition a pyrotechnic device 52 is provided for emergency tensioning. If a severe impact does in fact occur after the pretensioning, a pyrotechnic charge 54 is ignited and the gas which is thereby provided and introduced into the tube 16 brings about an additional tensioning, i.e. the belt buckle 10 is pulled away further downwards.

From the above description, it can be seen that as motor 48 a simple brush motor with only one direction of rotation can be used. As an alternative to the helical spring 18, a pneumatic or hydraulic pressure reservoir can also be used with a compressible fluid whereby, however, the mode of operation of the tensioner mechanism is not altered. The terms "upper" and "lower" used in the description (e.g. upper and lower teeth) and also "left" and "right" were selected for a clear description of the preferred embodiments according to the illustration in the figures, but are in no way to be understood as being restrictive.

What is claimed is:

1. A buckle tensioner for pre-tensioning a safety belt band, said buckle tensioner comprising a traction transmission device engaging on a belt buckle, a, motor and a pressure storing device which is able to be compressed by means of said motor, said traction transmission device being coupled in a force-fitting manner to said pressure storing device and said pressure storing device being arranged such that an expansion of said pressure storing device brings about a pulling away of said belt buckle for tensioning said safety belt band.

2. The buckle tensioner according to claim 1, wherein said pressure storing device comprises a helical spring.

3. The buckle tensioner according to claim 1, wherein said pressure storing device comprises a compressible fluid.

4. The buckle tensioner claim 1, wherein a sensor is provided by which a final position of said pressure storing device is detected.

5. The buckle tensioner claim 1, wherein said motor is constructed so as to be self-locking.

6. The buckle tensioner according to claim 1, wherein said pressure storing device is held in a compressed state by a locking device.

7. The buckle tensioner claim 1, wherein said expansion of said pressure storing device is brought about by a trigger device adapted to be activated by said motor.

8. The buckle tensioner claim 1, wherein said pressure storing device is compressed by means of a longitudinally displaceable first rack which is driven by said motor.

9. The buckle tensioner according to claim 8, wherein said motor is coupled to a pinion which engages into first teeth of said first rack, said first rack being brought out of engagement with said pinion by activation of a trigger device.

10. The buckle tensioner according to claim 9, wherein said trigger device comprises a trigger piece movably supported on said first rack and coupled to a second rack having teeth which are constructed so as to be complementary to second teeth of said first rack, said second teeth of said first rack being brought into engagement with said teeth of said second rack on activation of said trigger device, and said racks being arranged such and profiles of said teeth of said racks being constructed such that a relative displacement of said second rack with respect to said first rack brings said first teeth of said first rack into engagement with said pinion again.

11. The buckle tensioner according to claim 1, wherein a pyrotechnic device is provided for an emergency tensioning of said safety belt band, said pyrotechnic device being coupled to said buckle tensioner such that through said pyrotechnic device a further tensioning is achieved which goes beyond that obtained through said expansion of said pressure storing device.

\* \* \* \* \*

UNITED STATES PATENT AND TRADEMARK OFFICE
CERTIFICATE OF CORRECTION

PATENT NO. : 6,932,324 B2
DATED : August 23, 2005
INVENTOR(S) : Joachim Biller and Alexander Heilig It is certified that error appears in the above-identified patent and that said Letters Patent is hereby corrected as shown below:

<u>Column 4,</u>
Line 35, after "a (second occurrence)" delete ",".
Line 47, after "tensioner" insert -- according to --.
Lines 50, 55 and 58, after "tensioner" insert -- according to --.

Signed and Sealed this

Tenth Day of January, 2006

JON W. DUDAS
*Director of the United States Patent and Trademark Office*